United States Patent [19]

Hehmann et al.

[11] 4,091,892
[45] May 30, 1978

[54] PHASED TREATMENT NOISE SUPPRESSOR FOR ACOUSTIC DUCT APPLICATIONS

[75] Inventors: Horst W. W. Hehmann; Robert E. Kraft, Cincinnati, both of Ohio

[73] Assignee: General Electric Company, Cincinnati, Ohio

[21] Appl. No.: 658,700

[22] Filed: Feb. 17, 1976

Related U.S. Application Data

[63] Continuation-in-part of Ser. No. 502,141, Aug. 30, 1974, abandoned.

[51] Int. Cl.² ............................ F01N 1/00; E04B 1/99
[52] U.S. Cl. ................................... 181/286; 181/212; 181/213; 181/224; 181/252; 181/292
[58] Field of Search ............ 181/33 H, 33 HB, 33 D, 181/33 E, 33 F, 33 G, 42, 48, 252, 222, 224, 212, 213, 286, 292

[56] References Cited

U.S. PATENT DOCUMENTS

| | | | |
|---|---|---|---|
| 1,874,326 | 8/1932 | Mason | 181/255 |
| 3,353,626 | 11/1967 | Cremer et al. | 181/42 |
| 3,437,173 | 4/1969 | Ehrich | 181/48 |
| 3,439,774 | 4/1969 | Callaway et al. | 181/42 |
| 3,481,427 | 12/1969 | Dobbs et al. | 181/33 HB |
| 3,542,152 | 11/1970 | Adamson et al. | 181/50 |
| 3,821,999 | 7/1974 | Guess et al. | 181/33 H |
| 3,830,335 | 8/1974 | Zorumski | 181/33 F |
| 3,850,261 | 11/1974 | Hehmann et al. | 181/33 G |
| 3,955,643 | 5/1976 | Clark | 181/48 |

OTHER PUBLICATIONS

*Noise Reduction,* Ed. by L. L. Beranek, N.Y., McGraw-Hill, 1960, p. 277.
*Handbook of Noise Control,* Ed. by C. H. Harris, N.Y., McGraw-Hill, 1957, pp. 18–24.
*Application of Duct Lining Technology to Jet Aircraft,* A. H. Marsh-The Journal of the Acoustical Society of America, vol. 48(3), 1970, pp. 826–842.
*Study of Acoustical Treatment for Jet Engine Nacelles,* The Journal of the Acoustical Society of America, by A. H. Marsh, vol. 43-(5), 1963, pp. 1137–1156.

*Primary Examiner*—Stephen J. Tomsky
*Attorney, Agent, or Firm*—Robert C. Lampe, Jr.; Derek P. Lawrence

[57] ABSTRACT

A phased treatment noise suppression panel is provided for use in an exhaust duct. The panel consists of individual sections designed with specific modal attenuation characteristics and located axially within the duct in such a sequential order, with respect to the noise source, as to take maximum advantage of modal redistribution effects on overall noise suppression.

6 Claims, 8 Drawing Figures

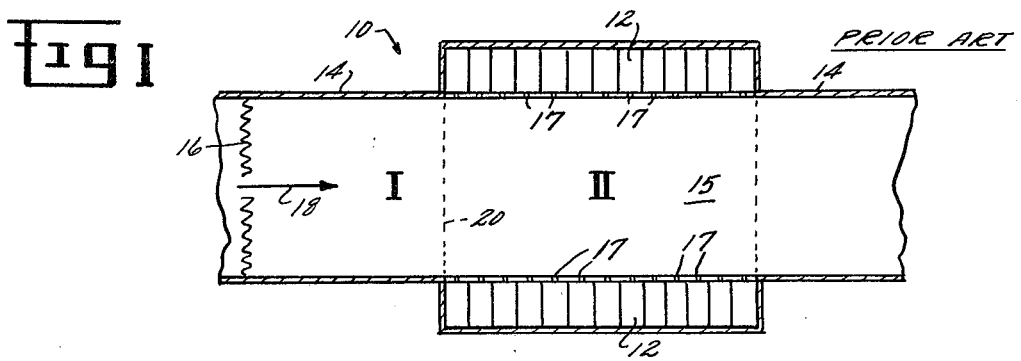
Fig. 1 PRIOR ART
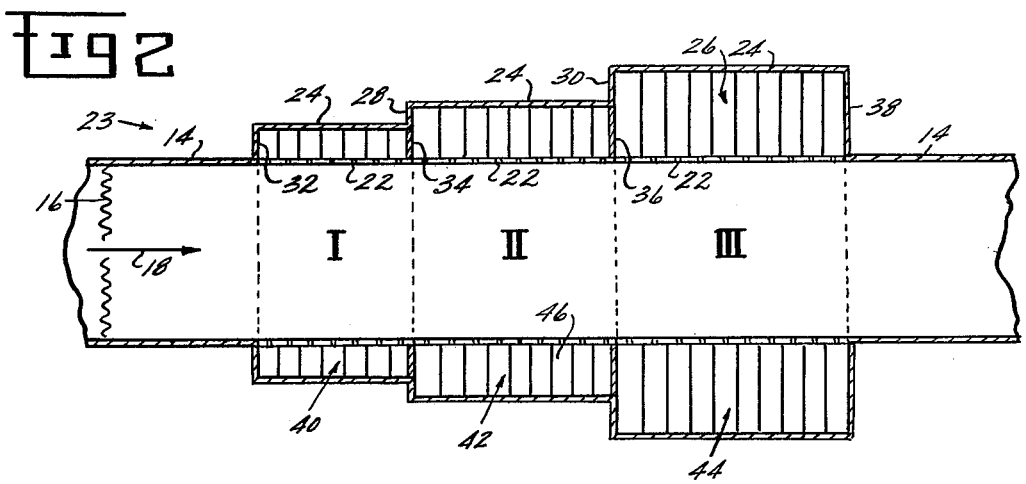
Fig. 2
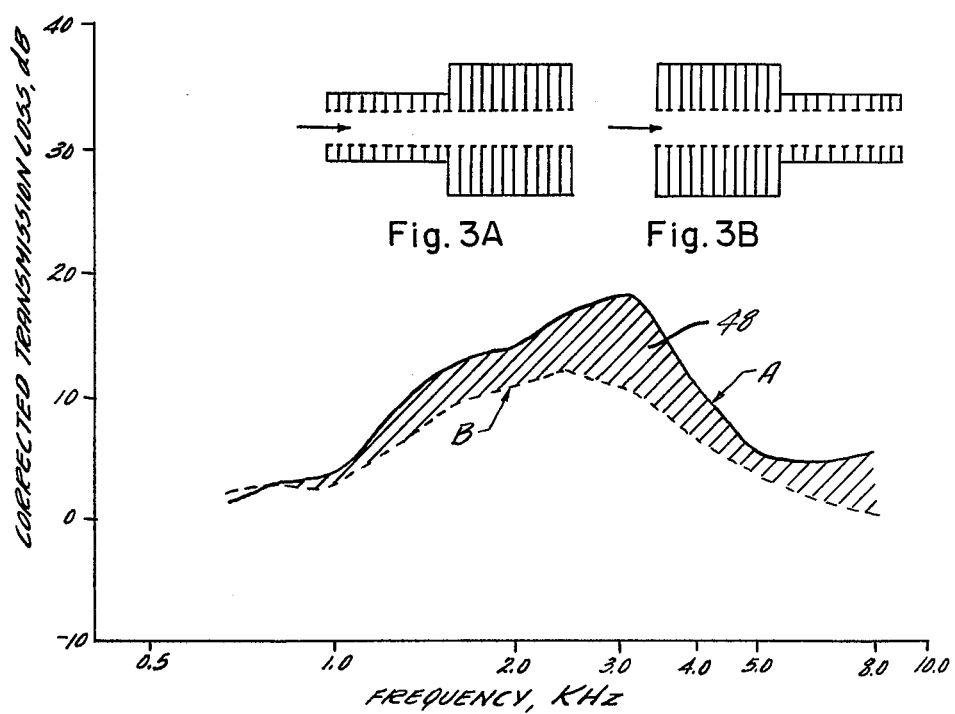
Fig. 3A  Fig. 3B
Fig. 3C

PHASED TREATMENT NOISE SUPPRESSOR FOR ACOUSTIC DUCT APPLICATIONS

BACKGROUND OF THE INVENTION

This is a continuation-in-part application of patent application Ser. No. 502,141, filed Aug. 30, 1974, now abandoned.

This invention relates to sound suppression systems and, more particularly, to sound suppression panels for use with gas turbine engines.

More effective noise suppression systems are required to meet the more stringent community noise level standards which are anticipated to be adopted in the future. Of particular concern is the reduction of noise level produced by gas turbine engines, particularly during aircraft taxiing, takeoff, and landing, when many individuals are exposed to the sound footprint of the gas turbine engine. Traditionally, the aircraft industry has pioneered technological advances which often have yielded peripheral benefits for use in nonaircraft-oriented areas. The subject of noise suppression is no exception, and a sound-proofing or noise-reducing technique which will quiet gas turbine engines will, in all probability, find other commercial applications in homes and industry.

Noise reduction techniques on aircraft gas turbine engines must satisfy certain practical considerations. For example, a sound suppressor must be reliable and relatively simple, and to be economically feasible it cannot detract from engine performance or be difficult or costly to manufacture. Further, due to the complexities of gas turbine engines, emitted noise includes certain discrete frequencies as well as broad-band noise, and an effective suppressor should, therefore, have a broad range of sound attenuation.

There are two fundamental sources of aircraft-generated noise. One is due to the viscous shearing which takes place between the rapid exhaust gases and the relatively quiescent surrounding air. Solutions to this problem involve the use of mixers which eliminate much of this viscous shearing. The second noise source, toward which this invention is directed, is that produced by the rotating turbomachinery blade rows, such as the fan, compressor, or turbines, and that produced by fluid flow past stationary objects.

Prior state of the art sound suppressors have, at best, met with marginal success. Generally speaking, two basic approaches have been explored. The first is the use of bulk absorbers. These comprise a continuous sheet of porous material disposed about the duct inner wall to absorb radiating sound. A disadvantage of such a technique is that, although high frequency attenuation is possibile with relatively thin bulk absorbers, as the frequencies get lower the layer must become proportionately thicker. Eventually the trade-off in weight and performance is unacceptable. Further, these porous sheets tend to absorb fluids and generally lack the required mechanical integrity necessary in gas turbine engines. The second state of the art approach is the use of conventional Helmholtz resonators and quarter-wave tubes. Helmholtz resonators and quarter-wave tubes consist of cavities comprising side and back walls and a permeable facing sheet. Though effective in reducing noise, they are only effective over a relatively narrow noise band width centered at a particular, predetermined resonant frequency which is a function of several variables including cavity size. To achieve broad-band capability the resonator must be provided with multiple degrees of freedom within a single cavity (i.e., mechanically changing the size of the resonator cavity) which is mechanically complex and weighty, or the resonators require a variety of cavity sizes to cover the frequency range of concern. Making the most effective use of this latter technique in exhaust ducts can result in an extremely efficient, lightweight sound suppressor.

SUMMARY OF THE INVENTION

The object of the present invention, therefore, is to provide a new and improved sound suppression panel for exhaust ducts, the panel being of the multiphase suppressor type with varying cavity sizes.

The phased treatment noise suppression concept of the present invention consists of placing a series of acoustically different suppression panel sections adjacent to one another upon the walls of an exhaust duct. The treatment may consist of two or more sections of differing acoustic characteristics. The design concept disclosed herein consists of designing individual treatment sections for specific modal attenuation characteristics at certain frequencies in a manner known to those skilled in the art, and then locating the sections in the duct in such a sequential order with respect to the direction of the source of noise as to take maximum advantage of modal redistribution effects on the overall noise suppression as will be hereinafter discussed. It is the selection of the order in which the sections are placed in the duct which constitutes the basis for the improved design concept.

DESCRIPTION OF THE DRAWINGS

While the specification concludes with claims particularly pointing out and distinctly claiming the subject matter which is regarded as part of the present invention, it is believed that the invention will be more fully understood from the following description in connection with the accompanying drawings, in which:

FIG. 1 is a schematic representation of a prior art acoustically treated exhaust duct;

FIG. 2 is a schematic representation of an exhaust duct incorporating an embodiment of the present invention;

FIG. 3A depicts schematically a fluid flow duct constructed in accordance with the present invention;

FIG. 3B depicts schematically a prior art fluid flow duct;

FIG. 3C is a graphical representation comparing the acoustic performances of the fluid flow ducts of FIGS. 3A and 3B;

DESCRIPTION OF THE PREFERRED EMBODIMENT

Figure 4A:
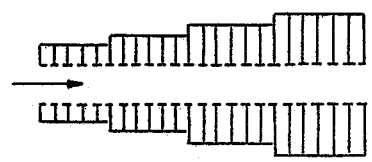
FIG. 4A depicts schematically an alternative embodiment of a fluid flow duct constructed in accordance with the present invention.

Attention is first directed to FIG. 1 wherein a prior art exhaust duct assembly is generally depicted at 10. An acoustically absorbent lining material 12 is incorporated circumferentially into the rigid duct walls 14 over a predetermined axial length of the duct (Region II), the acoustically absorbent material being in fluid communication with the duct interior 15 by means of wall perforations 17. Sound waves 16 primarily propagate in the direction depicted by arrow 18, this arrow also representing the direction of fluid flow within the duct 10. In such a configuration, two fundamental processes occur which are of significance in the suppression of transmitted noise. As an illustration of the first effect, consider the following situation. Acoustic energy waves 16 are traveling from left to right (see arrow 18) in Region I, these energy waves being partitioned into the set of modes characteristic of this rigid walled section. Upon incidence with Region II the acoustic energy is repartitioned to the mode set of this duct section treated with lining material 12. Depending on the acoustic impedance properties of treated Section II, modes which correspond in sequential order to the rigid wall 14 and wall section lined with material 12 may have distinctly different shapes, indicating a modal incompatibility between the two sections. As a result of this incompatibility some energy is reflected at the plane of the interface 20 between Regions I and II back toward the left in Region I.

These two effects, partial reflection and modal redistribution, occur at any plane of the duct 10 at which the walls undergo a discontinuity in acoustic impedance, whether from hard wall to treated section or from one treated section to another with different treatment impedance properties. The effects of reflection of energy at an interface tend to cause some noise suppression under certain conditions as is known in the art.

The second effect previously referred to, modal redistribution, is the subject of the present invention. As previously noted, the energy which passes the interface 20 between Region I and Region II is redistributed into the characteristic modes of the lined section, Region II. As each of these modes propagates along the lined section, energy is absorbed by the walls lined with acoustic material 12. The amount of energy absorbed from each mode, or its rate of energy attenuation, is a distinct quantity depending on the cross-sectional geometry and the acoustic properties of the lining. The total suppression provided by the treated section is the sum of the energies absorbed from each mode, so that the suppression depends on both the modal rates of decay and on the amount of energy participation of each mode.

It has been discovered that it is advantageous, in low resistance liners, to arrange adjacent sections of treatment such that the modal incompatibility between the two sections, Region I and Region II, causes the preceding section to present a pressure pattern to the succeeding section which redistributes into higher order modes of the succeeding sections. The increased attenuation of these higher modes then significantly enhances the overall performance of the suppression system. As previously noted, this invention is directed primarily to low resistance liners, herein defined as those wherein:

R = effective acoustic resistance of the liner at an effective design sound pressure level (SPL) of at least 160 dB;

$\rho c$ = impedance of free air, a nondimensionalized constant; and $R/\rho c$ is essentially less than 0.2.

It is important to emphasize that R represents the effective acoustic resistance of the liner at a predetermined sound pressure level and a predetermined fluid velocity, and not the nominal resistance thereof. Further, the predetermined sound pressure level and predetermined fluid velocity are defined such that the effective sound pressure level (SPL) is at least 160 dB. As is well known, the effective sound pressure level comprises the acoustic sound pressure field plus the pseudo-sound pressure field generated by hydrodynamic pressure fluctuations (which, in turn, is determined by the flow velocity). Typically, the acoustic range of significance in gas turbine engine exhaust ducts, toward which the present invention is primarily directed, is that wherein the SPL is 160 dB or higher. Thus, the effective acoustic resistance of the liner, at a sound pressure level of at least 160 dB, should be less than or equal to 0.2 times the impedance of free air. It is recognized that in other applications for lower values of effective SPL (or lower fluid velocity) the effective acoustic resistance must necessarily be much less than 0.2 times the impedance of free air. But, in accordance with the present invention, at an effective sound pressure level of at least 160 dB, the effective acoustic resistance must be less than 0.2 times the impedance of free air.

The phased treatment noise suppression concept of the present invention consists of placing a series of acoustically differently treated sections adjacent to one another. As illustrated in FIG. 2 a first sound wave permeable wall 22 of effective acoustic resistance R partially defines a duct depicted generally at 23. A second substantially sound wave impermeable wall 24 is spaced radially outwardly from the first wall 22 and defines a gap 26 therebetween. In the embodiment of FIG. 2, the second wall 24, or the backing wall, increases step-wise in radial height in the axial direction of fluid flow and primary sound propagation, the steps occurring at 28 and 30, respectively. Circumferentially extending and axially spaced partitions 32 34, 36 and 38 extend substantially between walls 22 and 24, and cooperate to divide gap 26 into axially adjacent chambers 40, 42 and 44, respectively. Acoustic material 46 of the honeycomb variety is disposed within each of the chambers.

In essence, the duct walls 14 are treated acoustically with panels of honeycomb-filled chambers which increase in thickness in the down-stream direction. Though FIG. 2 depicts a series of three-stepped chambers I, II and III, respectively, the treatment may consist of two or more sections (always oriented from thin to thick).

The design concept of the present invention considers designing individual treatment sections for specific modal attenuation characteristics at certain frequencies as is known in the art, but further locating the sections in the duct in such a sequential order with respect to the direction of the source as to take maximum advantage of the aforementioned modal redistribution effects on the overall noise suppression. The selection of the order in which these sections are placed in the duct (thin to thick), in combination with a low resistance liner as previously defined, constitutes the novelty of the improved design concept.

As an example of the results which might be expected from this design procedure, consider now the test results of FIG. 3C, which presents transmission loss spectra measured in a rectangular duct for two multiphase treatment configurations with a tested mean flow Mach number of 0.4. Curve A of FIG. 3C represents the attenuation of the configuration of FIG. 3A with the thin treatment upstream of the thick treatment. Curve B represents the attenuation when the order of the sections is reversed, as depicted in FIG. 3B. The difference between Curve A and Curve B, designated by the shaded area 48, illustrates how an increase in suppression can be attained by taking advantage of the beneficial effects of modal redistribution which occur for the treatment in one orientation but not in the other. Since the overall treatment in the duct is the same and the same design considerations and calculations for discrete frequencies are applicable in both cases, it is evident that no weight penalties are incurred from this design process. These standard types of treatment have been demonstrated to incur no objectionable performance loss.

Figure 4B:
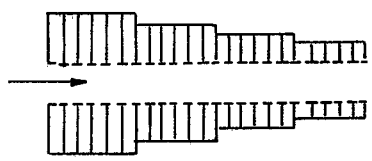
FIG. 4B depicts schematically a fluid flow duct typical of the prior art having the orientation of the acoustic liners reversed from that of FIG. 4A.
Figure 4C:
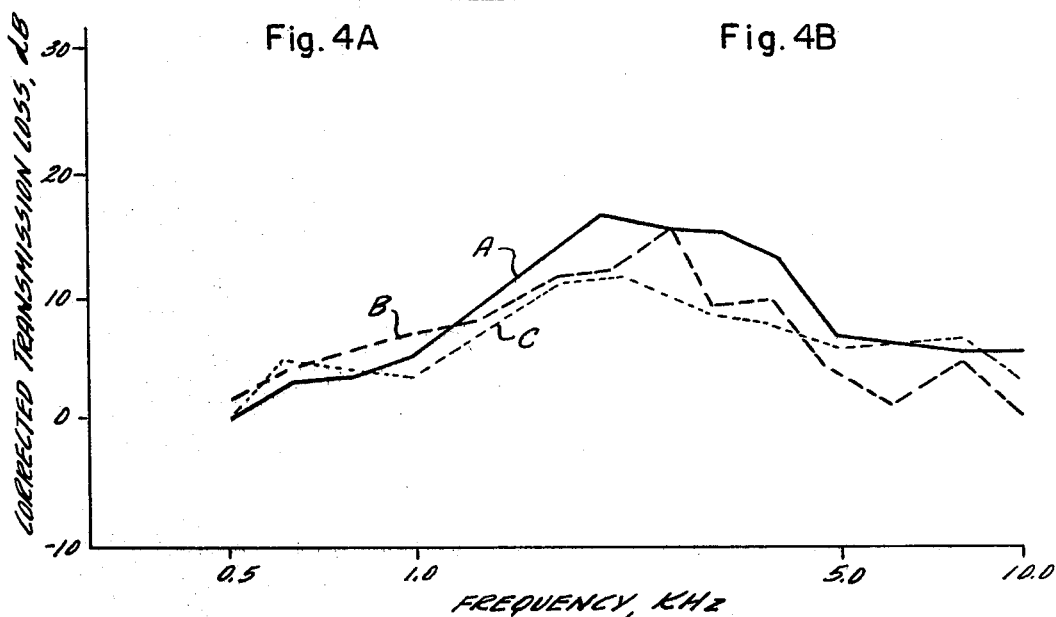
FIG. 4C is a graphical representation comparing the acoustic performances of the fluid flow ducts of FIGS. 4A and 4B with the theoretical calculated values.

FIG. 4C presents additional test information of the multiphase liner effects, and in this case for a design consisting of four lined sections, each with a different backing depth. In the frequency range of 1500 Hz to 5000 Hz, a definite suppression enhancement occurs for the configuration of FIG. 4A, which is oriented such that the backing depth increases step-wise in the direction of sound propagation from thin to thick (Curve A, FIG. 4C). This enhancement occurs for both the no-flow case as well as where the flow is in the same direction as sound propagation. When the orientation of the liners is reversed, going from thick to thin as in FIG. 4B, a general decrease in suppression is noted over the entire frequency range (Curve B, FIG. 4C). However, above 5000 Hz the multiphase effects are no longer working in a beneficial manner, as the curves fall below the hypothetical calculated values based on no interaction effects, as depicted by Curve C. Further, this inventive concept is limited to low resistance liners as previously discussed.

Current design practices, based on a simpler theory of modal attenuation, have been to locate the thicker treatment closer to the sound source. This invention clearly demonstrates that an increase in suppression effectiveness can be obtained by a reversal of this design practice, that is by locating the thinner treatment closer to the sound source. Though the increased effectiveness of the subject invention is clear as applied to exhaust ducts, no acoustic improvement was observed when the subject treatment was applied to inlet ducts. However, no acoustic penalty was measured either.

It should be obvious to one skilled in the art that certain changes can be made to the above-described sound wave suppressing panel without departing from the broad inventive concepts thereof. For example, FIGS. 2 and 4A depict three- and four-cell structures, respectively. Since noise attenuation increases with the number of axially adjacent acoustic chambers, the present invention contemplates all combinations of acoustic chambers wherein the chamber thickness goes from thin to thick, and is not limited by the embodiments of FIGS. 2 and 4A. Further, repeating sets of acoustic chambers as herein taught, in the axial direction, will further increase sound attenuation. Additionally, the invention is not limited to the use of conventional honeycomb within the acoustic chamber wherein the walls of the honeycomb are disposed perpendicular to the acoustically permeable front wall. This invention contemplates leaning the walls of the honeycomb at an angle with respect to the front sheet so as to vary the length of each resonator cavity without necessarily increasing its thickness as taught by Hehmann et al in U.S. Pat. No. 3,850,261, "Wide Band Width Single Layer Sound Suppressing Panel," which is assigned to the same assignee as the present invention. The present invention could also be applied to reverse flow ducts, such as those associated with reverse pitch fan gas turbine engines wherein the flow is caused to reverse direction within the duct. Both the inlet and exhaust ducts could be lined with the acoustic treatment of the present invention. Regardless of the flow direction, sound attenuation would be enhanced in the duct portion functioning as the exhaust duct, without incurring acoustic or performance penalties in the remainder of the duct. It is intended that the appended claims cover these and all similar variations in the Applicants' broader inventive concepts.

Having thus described the invention, what is considered novel and desired to be secured by Letters Patent of the United States is:

1. A sound wave suppressing panel for use in an exhaust duct having noise emanating within and in the direction of the duct fluid flow, the panel including:
    a first sound wave permeable wall partially defining the duct, said first sound wave permeable wall having an effective acoustic resistance, at an effective sound pressure level of at least 160 dB, of less than or equal to 0.2 times the impedance of free air; and
    a second sound wave impermeable wall spaced radially from the first wall defining a substantially annular gap therebetween, said second wall increasing step-wise in radial height in the axial direction of fluid flow and sound propagation so as to define axially adjacent gap sections having differing acoustic modal characteristics, and wherein the acoustic modal incompatibility between successive adjacent sections causes the preceding upstream section to present a pressure pattern to the succeeding downstream section which redistributes into higher order modes, said modes being substantially absorbed by said downstream sections.

2. The sound wave suppressing panel of claim 1 wherein at least a portion of said annular gap contains a sound suppressing core of the honeycomb type.

3. A sound wave suppressing panel for use in an exhaust duct having noise therein emananting in the direction of the duct fluid flow, the panel including:
    a first sound wave permeable wall partially defining the duct, said first sound wave permeable wall having an effective acoustic resistance, at an effective sound pressure level of at least 160 dB, of less than or equal to 0.2 times the impedance of free air;
    a second sound wave impermeable wall spaced from the first wall defining a gap therebetween;
    a plurality of partitions of increasing height in the direction of fluid flow and sound propagation, said partitions extending substantially between said first and second walls for dividing said gap into a plurality of axially adjacent chambers of differing acoustic modal characteristics, and wherein the acoustic modal incompatibility between successive adjacent chambers causes the preceding upstream chamber to present a pressure pattern to the succeeding downstream chamber which redistributes into higher order modes, said modes being substantially absorbed by said downstream chambers.

4. A sound wave suppressing panel for use in an exhaust duct having noise therein emanating in the direction of the duct fluid flow, the panel including:
    a first sound wave permeable wall partially defining the duct, said first sound wave permeable wall having an effective acoustic resistance, at an effective sound pressure level of at least 160 dB, of less than or equal to 0.2 times the impedance of free air;

a second sound wave impermeable wall spaced from the first wall for defining a gap therebetween;

a plurality of partitions of increasing height in the direction of fluid flow and sound propagation, said partitions extending substantially between said first and second walls for dividing said gap into a plurality of axially adjacent chambers of differing acoustic modal characteristics, wherein at least one of said chambers increases step-wise in height in the axial direction of fluid flow and sound propagation with respect to an adjacent preceding upstream chamber and wherein the acoustic modal incompatability between successive adjacent chambers causes the preceding upstream chamber to present a pressure pattern to the succeeding downstream chamber which redistributes into higher order modes, said modes being substantially absorbed by said downstream chambers.

5. The sound wave suppressing panel of claim 4 wherein at least one of said chambers contains a sound suppressing core of the honeycomb type.

6. The sound wave suppressing panel of claim 4 wherein each of said chambers contains a sound suppressing core of the honeycomb type.

* * * * *